United States Patent

[11] 3,591,186

[72] Inventor Sanjiro Murata
Kamiosaki, Shinagawa-ku, Tokyo-to, Japan

[21] Appl No. 638,408
[22] Filed May 15, 1967
[45] Patented July 6, 1971
[32] Priority June 15, 1966
[33] Japan
[31] 41/38246

[54] ULTRAMINIATURIZED TAPE RECORDER
1 Claim, 7 Drawing Figs.

[52] U.S. Cl. .......... 274/4
[51] Int. Cl. .......... G11b 5/48
[50] Field of Search .......... 274/4, 11; 179/100.2 Z; 242/55.19 A, 55.19, 55.13

[56] References Cited

UNITED STATES PATENTS

| | | | |
|---|---|---|---|
| 3,394,899 | 7/1968 | Schoenmakers .......... | 242/55.19 |
| 3,285,613 | 11/1966 | Hallamore .......... | 274/4 |
| 2,713,618 | 7/1955 | McNabb .......... | 274/4 |

FOREIGN PATENTS

| | | | |
|---|---|---|---|
| 853,873 | 11/1960 | Great Britain .......... | 274/4 (C) |

*Primary Examiner*—Harry N. Haroian
*Attorney*—Holman, Glascock, Downing & Seebold

ABSTRACT: An ultraminiature tape recorder of double panel type having a case comprising front and rear (or upper and lower) compartments partitioned by a dividing means wherein, in one compartment a recess is provided for a tape cartridge with a recording button on that side. In the opposite compartment, a speaker is provided arranged to emit sound in a direction away from the first compartment, and a reproducing button is provided on the side opposite the recording button, thereby eliminating erroneous operation of the recording and reproducing buttons and permitting increased speaker size for a given overall recorder size. Means are provided whereby all of the components of the recorder are actuated on pushing the recording button, whereas all of the components with the exception of the erasing head are actuated on pushing the reproducing button.

ULTRAMINIATURIZED TAPE RECORDER

The invention relates to tape sound recorders and more particularly to a new ultraminiaturized tape recorder in which a tape cartridge is used, and which has several highly desirable features as hereinafter described in detail.

Most tape sound recorders known heretofore have been of the type wherein sound recording type on reels is loaded on the upper panel of the recorder case, and both sound recording and reproducing are carried out with the recorder in the same position. Accordingly, in order to cause the recorder to perform the separate operations of recording and reproducing, a plurality of switch buttons as, for example, two buttons for recording and one button for reproducing, are used, and the button or buttons for each operation must be correctly selected from among a group of buttons.

As a result, frequent instances of erroneous control manipulation due to erroneous selection of the control buttons occur. For example, when reproduction is intended, the recording buttons may be erroneously pushed, whereby the recorded sound is erased, or, when recording is intended, the reproduction button may be erroneously pushed, whereby recording becomes impossible. Thus, such known tape recorders have the disadvantageous feature of not being easily operable by children and other unskilled persons and not being operable in the dark.

Furthermore, in known tape recorders of the above-mentioned character, the loudspeaker must necessarily be mounted immediately below and facing the upper panel or facing the sidewall nearest the operator because of the above-described operations with the recorder case maintained in the same position. When the loudspeaker is to be mounted below the upper panel, a loudspeaker space outside of the tape space is required, and even if the overall thickness of the recorder can be made small, the planar size thereof becomes large. When the loudspeaker is mounted on the sidewall of the case nearest the operator, the height of the case becomes large because the loudspeaker must be mounted on a vertical panel. Therefore, it has not been possible to miniaturize tape recorders to a so-called "pocket size."

It is an object of the present invention to overcome the above-described difficulties associated with prior tape recorders.

More specifically, an object of the invention is to provide an ultraminiature tape recorder which can be operated without error by unskilled persons and even in the dark, without the necessity of selecting the correct control buttons for recording and reproducing from among a group of control buttons. This object has been achieved by positioning the control buttons for recording and reproducing on respectively opposite sides of the recorder case.

Another object of the invention is to provide an ultraminiature tape recorder of pocket size having an overall volumetric size which is approximately one-half of that attainable heretofore and having a loudspeaker of a size equal to that of loudspeakers heretofore used in tape recorders, whereby the tone quality of sound reproduction of conventional recorders is preserved. This object has been achieved by mounting the loudspeaker in a position to face the planar side of the recorder case opposite the side into which the tape is loaded.

A further object of the invention is to provide a tape recorder of the above-stated character having a relatively simple and inexpensive organization. Such a tape recorder is referred to as a "double panel type." When used throughout this disclosure, "double panel type" is meant to refer to a tape recorder which has important components and controls mounted on both of its opposite faces, or panels, and therefore in certain modes of operation the tape recorder must be turned over.

According to the present invention, briefly summarized, there is provided an ultraminiature tape recorder of double panel type having a case with a front panel side and a rear panel side opposite to the front panel side, means installed on the front panel side for receiving a tape cartridge, a loudspeaker mounted to face the rear panel side, means including the loudspeaker and operating in conjunction with the sound tape within the cartridge to accomplish sound recording, reproducing, erasing, and rapid rewinding, all operational parts being enclosed within the case, and control bottoms respectively for controlling the sound recording and reproducing positioned to project outside of the case at positions suitable for easily accomplishing sound recording with the front panel side facing upward and sound reproduction with the rear panel side facing upward.

The nature, principle, and details of the invention, as well as the utility thereof, will be more clearly apparent from the following detailed description with respect to a preferred embodiment of the invention when read in conjunction with the accompanying drawings, in which like parts are designated by like reference numerals and characters.

Figure 1:
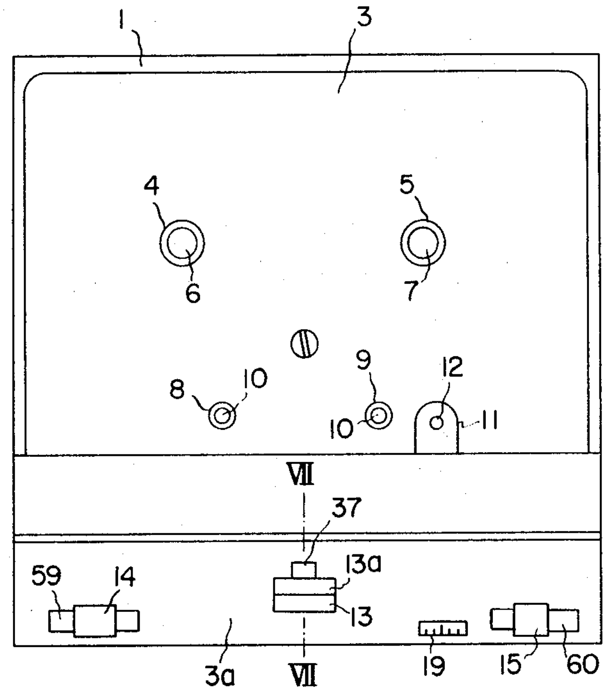
FIG. 1 is a top plan view showing the front exterior of an example of a tape recorder embodying the invention.

In the preferred embodiment of the invention as illustrated in the drawings, the mechanical and electrical operational parts of the recorder are enclosed within a case 1, the interior of which is divided by a baseboard 20 into front and rear compartments. The front side of the case 1 is provided with a freely openable upper lid 2 made of a transparent resin and covering a relatively shallow recess 3 of traylike form adapted to accommodate a tape cartridge (not shown).

The left and right spindle holes of the cartridge, in loaded state, fit onto reel spindles 6 and 7 projecting into the central part of the recess 3 respectively through holes 4 and 5 formed in the bottom of the recess 3.

On one side of the spindles 6 and 7 nearer the pushbuttons described hereinbefore (i.e., below the spindles 6 and 7 as viewed in FIG. 1), there are provided guide pins 10, 10 and a capstan or constant-speed spindle 12 for driving the tape similarly projecting into the recess 3 respectively through holes 8, 9, and 11. On a stepped control panel 3*a* also on the front side of the case 1, there are installed a recording button 13 at the central part, rewinding buttons 14 and 15 respectively at the left and right ends, and a level meter 19.

Figure 2:
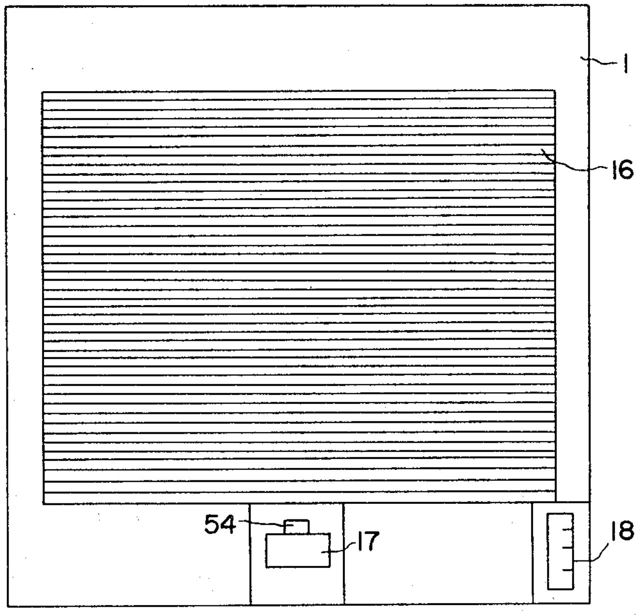
FIG. 2 is a bottom plan view showing the rear exterior of the recorder shown in FIG. 1.

The reverse or rear side of the case is provided with a grill 16 for passing out sound from an internally installed loudspeaker S, a reproducing button 17 at the central part below (as viewed in FIG. 2) the grill 16, and a sound volume indicator 18.

The interior mechanisms are organized in the following manner. In the rear compartment of the case, in the upper right-hand part (as viewed in FIGS. 5 and 6) thereof, a motor M is mounted with its shaft parallel to the aforementioned spindles. In the upper right-hand part of the same compartment, a battery case B for accommodating four 1.5-volt cells, each of 14.5-mm. diameter and 50-mm. length, is so installed that it can be readily pulled out. The loudspeaker S is mounted below the battery case B to face the rear side of the case 1, and an amplifier A is installed in the remaining space of the same rear compartment. The aforementioned baseboard 20 forms the inner partition wall of this rear compartment and is fixed in place by suitable screws.

A sliding plate 21 is slidably mounted on the front face of the baseboard 20 and supports on its front surface a recording-reproducing head 22 in the center, an erasing head 23 on left-hand side, and a pressure roller 24 on the right-hand side. The sliding plate 21 is provided at each of its left and right ends with through holes 25 and 26 in tandem alignment in the direction of movement of the sliding plate 21. The through holes 25 and 26 on each end of the sliding plate 21 are engageable by a roller 29 rotatably supported on the free end of an elastic plate 28 which is fixed at its other end by a screw 27 to the front surface of the baseboard 20, the roller 29 being urged against the sliding plate 21 and toward the baseboard 20 by the force of the elastic plate 28.

Figure 3:
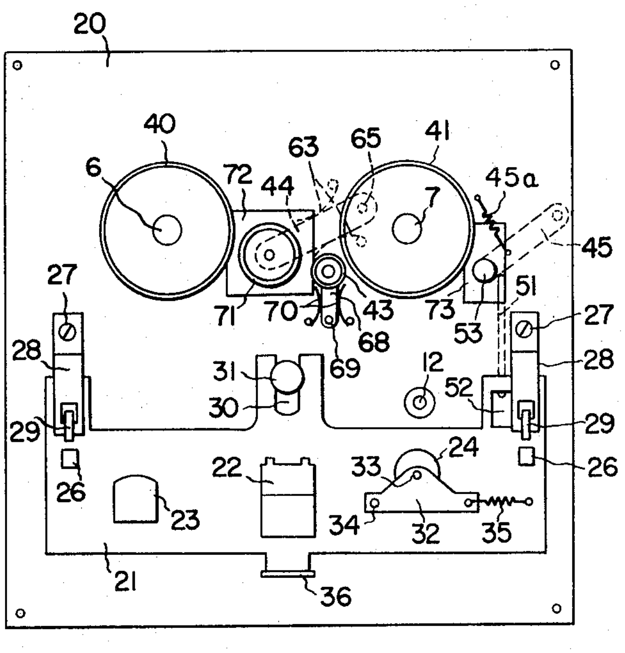
FIG. 3 is a top plan view showing the internal mechanism and organization of the recorder.

The sliding plate 21 is further provided at its central part, above the recording-reproducing head 22 (as viewed in FIG. 3), with a through slot 30 engaged by a guide pin 31 fixed to the front surface of the baseboard 20. The aforementioned pressure roller 24 is rotatably mounted by means of a pin 33 on a support lever 32 pivoted at one end by a pin 34 to the sliding plate 21 and pulled at the other end by a spring 35.

The sliding plate 21 is provided at its central part on the side opposite the slot 30 with a lug 36 bent perpendicularly to the sliding plate toward the front side of the case 1 and projecting through a slot 37 in the aforementioned button panel 3*a* somewhat beyond the outer surface of this panel 3*a*. In assembled state, this lug 36 is capped by a button 13*a* press fitted thereon.

The aforementioned reel spindles 6 and 7 are rotatably supported at the central part of the baseboard 20 and are respectively provided at their base parts with discs 40 and 41 fitted thereon by known means whereby each spindle and its corresponding disc are not fixed but become engaged at a specific frictional force to rotate together, becoming disengaged when a force greater than the specific frictional force acts. Since such means are known, a detailed description thereof is herein omitted.

On the rear side of the baseboard 20, there is rotatably supported a pulley 42 driven by the motor M through a belt 47 stretched around the pulley 42 and a pulley fixed to the motor shaft 46. The pulley 42 is fixed to the base end of the aforementioned capstan or constant-speed spindle 12 for driving the tape. An arm 44 is pivoted at one end by a pin 65 to the rear surface of the baseboard 20 and rotatably supports a pulley 48 on the other end. The pulley 48 is driven by the motor M through its shaft 46, another pulley, and a belt 49 and is fixed to a shaft which fixedly supports at its end toward the front side a wheel 71. The wheel 71 projects toward the front through an opening 72 in the baseboard 20 and is centered in a position in the proximity of the periphery of the left-hand disc 40 by elastic plates 63, 63 pressing against opposite flank sides of the arm 44.

An arm 45 pivoted at one end to the rear surface of the baseboard 20 rotatably supports a pulley 50 at its free end and presses the pulley 50 against the aforementioned belt 47. The arm 45 is urged in the clockwise direction (as viewed in FIGS. 3 and 5) by a spring 45*a*. In its inoperative state, the arm 45 is pulled in the direction counter to that of the force of spring 45*a* by a rod 51 connected at one end to the arm 45 and engaging at its other end with an aperture 52 in the sliding plate 21 at the right-hand end thereof. A shaft pin 53 integral with the pulley 50 extends through an opening 73 toward the front beyond the front surface of the baseboard 20 and is positioned slightly apart from the periphery of the right-hand disc 41.

A recording button 13 is positioned adjacently to and below (as viewed in FIG. 1) the button 13*a*. When this button 13 is in the lower position, it opens the circuit of the erasing head 23 and closes the circuit of the amplifier (both circuits not shown), and, conversely, when it is pushed upward, the erasing head 23 circuit is closed and the amplifier circuit is opened.

The recording button 13 is pushed upward at the time of recording, at which time the button 13*a* is also pushed upward. Accordingly, the sliding plate 21 is caused to slide upward with the fixed pin 31 functioning as a guide, and the rollers 29 pressed toward the baseboard 20 by the elastic plates 28 are lifted out of the holes 25 and drop into the holes 26, thereby holding the sliding plate 21 in its recording position. Since the aperture 52 at this time releases the lower end of the rod 51, the arm 45 is pulled clockwise (as viewed in FIGS. 3 and 5) by the spring 45*a*, whereby the shaft pin 53 is pressed against the periphery of the right-hand disc 41.

At the same time, the recording-reproducing head 22 and the erasing head 23 are brought into contact with the tape in the cartridge, and the pressure roller 24 presses the tape against the capstan or constant-speed spindle 12. The upward movement of the sliding plate 21 simultaneously causes means (not shown) to close the power supply switch and the circuit of the motor M, whereby the tape within the cartridge is driven at constant speed toward the right and taken up by the rotation of the reel spindle 7 due to the counterclockwise rotation of the right-hand disc 41 driven by shaft pin 53. Since the driving mechanism of the reel spindle 7 is adapted to impart a reeling speed thereto tending to be somewhat higher than the speed of the arriving tape, the tape is reeled in a tensioned state.

During the above-described recording operation, the wheel 71 is separated from the left-hand disc 40 and an idler 43 described hereinafter, and the idler 43 is separated from the right-hand disc 41.

Upon completion of recording, the button 13*a* is moved downward to return the sliding plate 21 to its original position, whereby the motor and amplifier circuits are opened. The recording button 13 is simultaneously pushed downward to its original position, whereby the circuit of the erasing head 23 is opened.

The reproducing mechanism and its operation will now be described. For reproduction, the lid 2 is closed, and the case 1 is turned around so that the reverse or rear side thereof faces upward or toward the operator. At the lower central part of the rear face of the case 1, there is formed a slot 54 through which the rear end of a bar 55 extends outward and is capped by a reproducing button 17 press fitted thereon. The front end of this bar 55 is fixed to the lower side of the aforementioned sliding plate 21.

When the reproducing button 17 is pushed upward (as viewed in FIG. 2), the sliding plate 21 undergoes the same movement as that for recording. Accordingly, the tape is driven and reeled in exactly the same manner as in the case of recording. At this time, the button 13*a* moves upward together with the sliding plate 21, but the recording button 13 is left in its original position since no force acts thereon. Consequently, the erasing head 23 does not move, and the amplifier circuit is closed, whereby the loudspeaker S operates to reproduce the recorded sound. When the reproducing button 17 is returned to its original position, the power supply switch and the circuit of the motor M are opened, whereby the operation stops.

Figure 5:
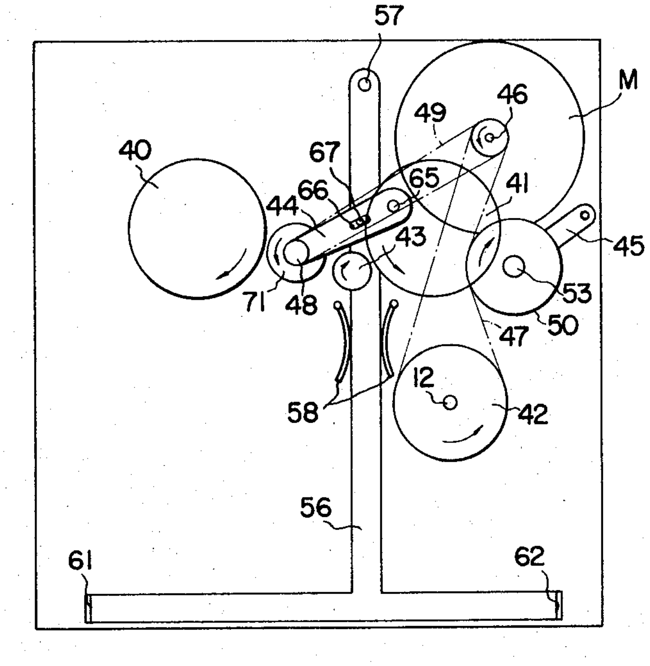
FIG. 5 is a diagrammatic plan view for a description of only the rotation transmitting mechanism of the mechanism shown in FIGS. 3 and 4.
Figure 4:
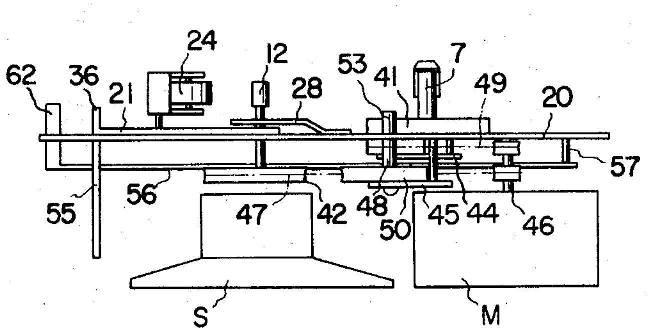
FIG. 4 is a right side elevational view, with a part deleted, of the mechanism shown in FIG. 3.
Figure 7:
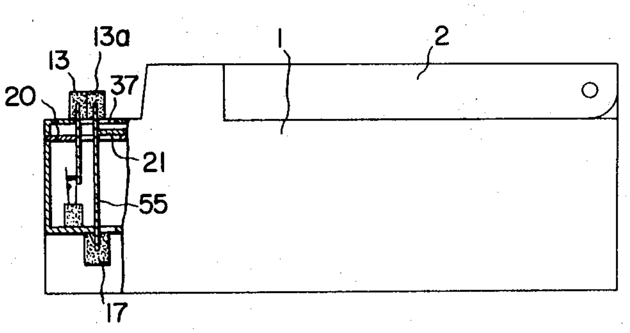
FIG. 7 is a right side elevation view partly in section taken along the vertical plane indicated by line VII–VII in FIG. 1.
Figure 6:
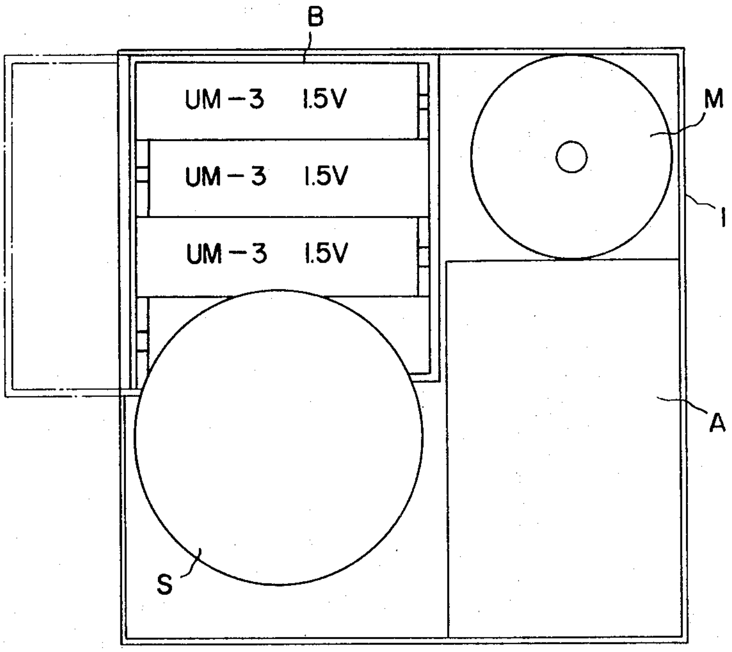
FIG. 6 is a bottom plan view showing the interior of the case rear compartment in the state wherein the rear panel is removed.

The tape rewinding mechanism and its operation will now be described. Referring to FIG. 5, a Tee-shaped actuating member 56 for rewinding operation is pivoted at its stem base end by a pin 57 to the rear upper part of the baseboard 20 and is stably centered at a specific angular position by a pair of elastic plates 58 pressing against opposite sides thereof. The left and right ends of the crossbar part of the member 56, which part is positioned near the lower part of the case 1, are bent toward the front to project out as lugs 61 and 62 through slots 59 and 60 in the button panel 3*a* of the front face of the case 1 and are capped respectively by rewinding buttons 14 and 15 press fitted thereon.

The actuating member 56 is provided at a point on its stem part crossed by the aforementioned arm 44 with a stud pin 67 fixed thereto and engaged with an inclined slot 66 formed in the arm 44.

The idler 43 is rotatably supported on the free end of an arm 68 pivotally mounted at its other end by a pin 69 on the baseboard 20 and centered by a pair of elastic plates 70 pressing against opposite sides thereof in a specific position. The idler 43 is normally in this centered position at which it is separated from the wheel 71 and the right-hand disc 41.

When the right-hand rewinding button 15 is pushed by hand to the right and thus held, the stud pin 67 swings slightly to the right about the pivot pin 57 and, accordingly, as it slides along the inclined slot 66, causes the arm 44 to swing also in the counterclockwise direction. Consequently, the pulley 48 presses the idler 43 lightly against the right-hand disc 41. Simultaneously, the motor is started by means (not shown) operating in response to the above-described operation, whereupon the right-hand disc 41 rotates in the counterclockwise direction at a speed which is several times that for reproduction and rewinds the tape at high speed to the right-hand side.

When the right-hand rewinding button 15 is released, the above-described mechanism is returned to its original state by the action of the pairs of elastic plates 58, 70, and 63.

When the left-hand rewinding button 14 is manually moved to the left and thus held, an operation which is reverse to that above-described takes place. That is, the arm 44 swings to the left to cause the wheel 71 to press against the left-hand disc 40, and, since the motor M is simultaneously started, the left-hand disc 40 rotates clockwisely at the above-mentioned high speed, whereby the tape is rewound at high speed to the left-hand side.

As described above in detail, the present invention provides a miniature tape recorder wherein, instead of carrying out sound recording and reproduction by control operations on the same face of the recorder as heretofore practiced, recording is carried out with the record in the position for loading a tape cartridge thereinto, and reproduction is carried out with the recorder turned around into inverted position. Accordingly, single control buttons respectively for recording and reproducing are respectively disposed in different positions for easy manipulation for each operation, and for either of the operations of recording and reproducing it is necessary merely to move only a single button positioned at some part of the outer surface of the recorder case.

Therefore, the tape recorder of the present invention can be controlled in a distinctly separated manner for recording and reproducing, whereby the recorder can be operated positively without error even by children and other unskilled persons and even in the dark. Furthermore, since the operating mechanisms are simple, the possibility of failures and trouble is low.

Another advantageous feature of the tape recorder of the invention is that, since the loudspeaker is positioned at the rear side, the entire recorder can be miniaturized to pocket size, and yet a relatively large loudspeaker can be used. Accordingly, a miniature tape recorder with good tone quality and of low price can be produced.

While the present invention has been described above with respect to an example thereof in which the recording and reproducing buttons are disposed respectively on the front and rear faces of the recorder case, these control buttons may be positioned at other positions as, for example, the lateral sides or the top and bottom sides, provided that such positions afford easy and errorproof manipulation.

Accordingly, it should be understood that the foregoing disclosure relates to only a preferred embodiment of the invention and that it is intended to cover all changes and modifications of the example of the invention herein chosen for the purpose of the disclosure, which do not constitute departures from the spirit and scope of the invention as set forth in the appended claims.

What I claim is:

1. An ultraminiature tape recorder of double panel type comprising
   - a case having a front and a rear,
   - dividing means within said case partitioning the same into front and rear compartments,
   - a recess provided on said front compartment adapted to detachably receive a tape cartridge therein,
   - reel spindles projected into said recess from said rear compartment, said spindles being adapted to fit said tape cartridge thereonto,
   - a capstan spindle for driving the tape, said capstan spindle projected into said recess from said rear compartment,
   - motor means carried within said rear compartment and operatively connected to said reel and capstan spindles for driving same,
   - a front control panel portion on said front compartment and a rear control panel portion on said rear compartment,
   - a recording button and rewinding buttons on said front control panel portion and a reproducing button on said rear control panel portion,
   - means operatively connecting said rewinding buttons to said reel spindles for selectively rewinding the tape in either direction,
   - a sliding plate slidably mounted on the front face of said dividing means in said front compartment for movement between a first position and a second position,
   - said recording and said reproducing buttons being operatively associated with said plate for selectively moving said sliding plate between said first and second positions,
   - means for selectively securing said sliding plate in said first and second positions,
   - a recording reproducing head and erasing head in said front compartment, each being supported on said sliding plate,
   - a loudspeaker means within said rear compartment,
   - battery means and amplifier means arranged with said motor means in said rear compartment,
   - means for connecting said motor means, battery means, amplifier means, loudspeaker means, said recording-reproducing head and erasing head to actuate all of said components when said sliding plate is moved to said second position by said recording button and means for connecting said motor means, battery means, amplifier means, loudspeaker means and recording-reproducing head to actuate all of said components with the exception of said erasing head when said sliding plate is moved to said second position by said reproducing button, whereby recording is carried out by moving said sliding plate by said recording button and reproduction is carried out by moving said sliding plate by said reproducing button.